Patented Apr. 30, 1935

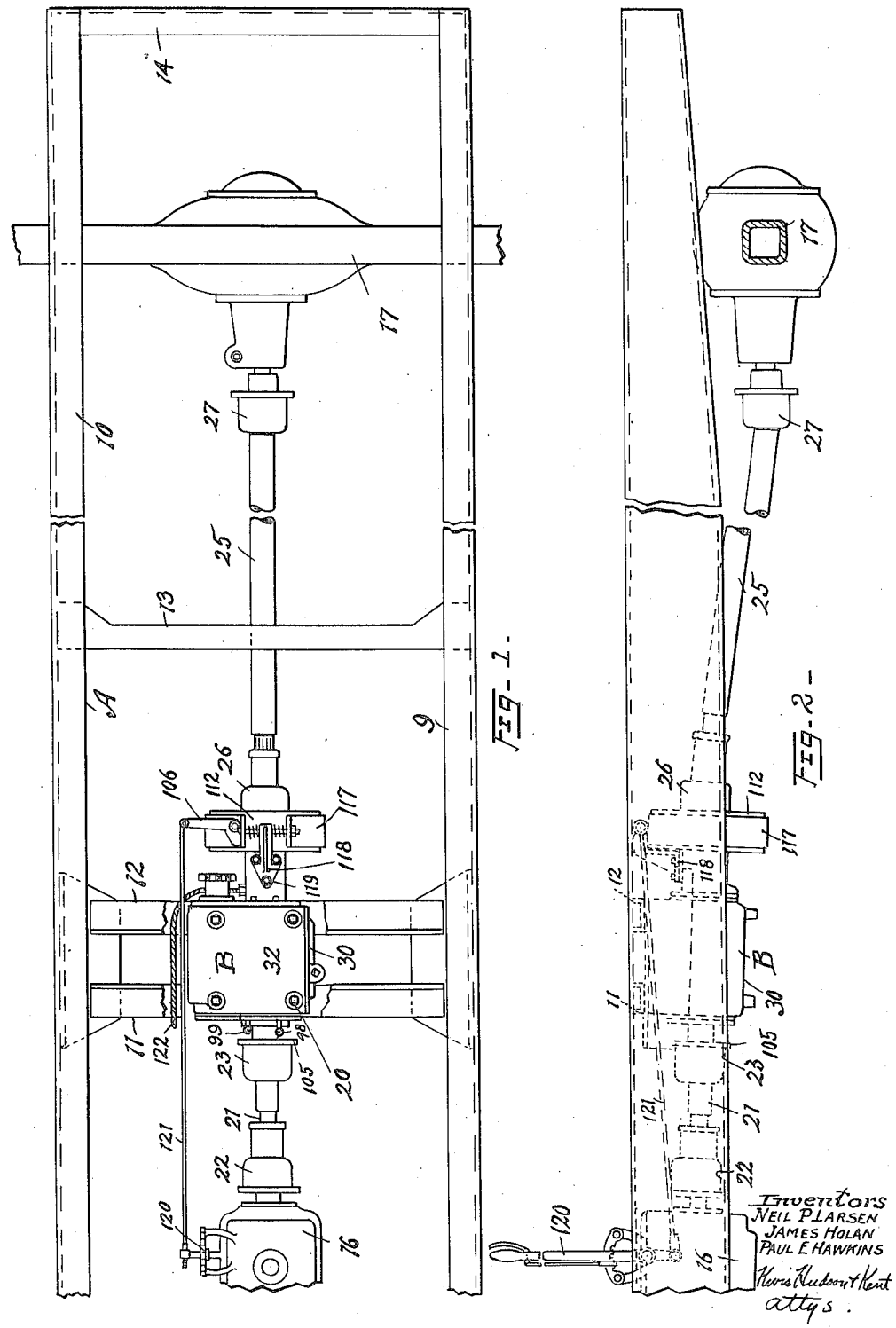

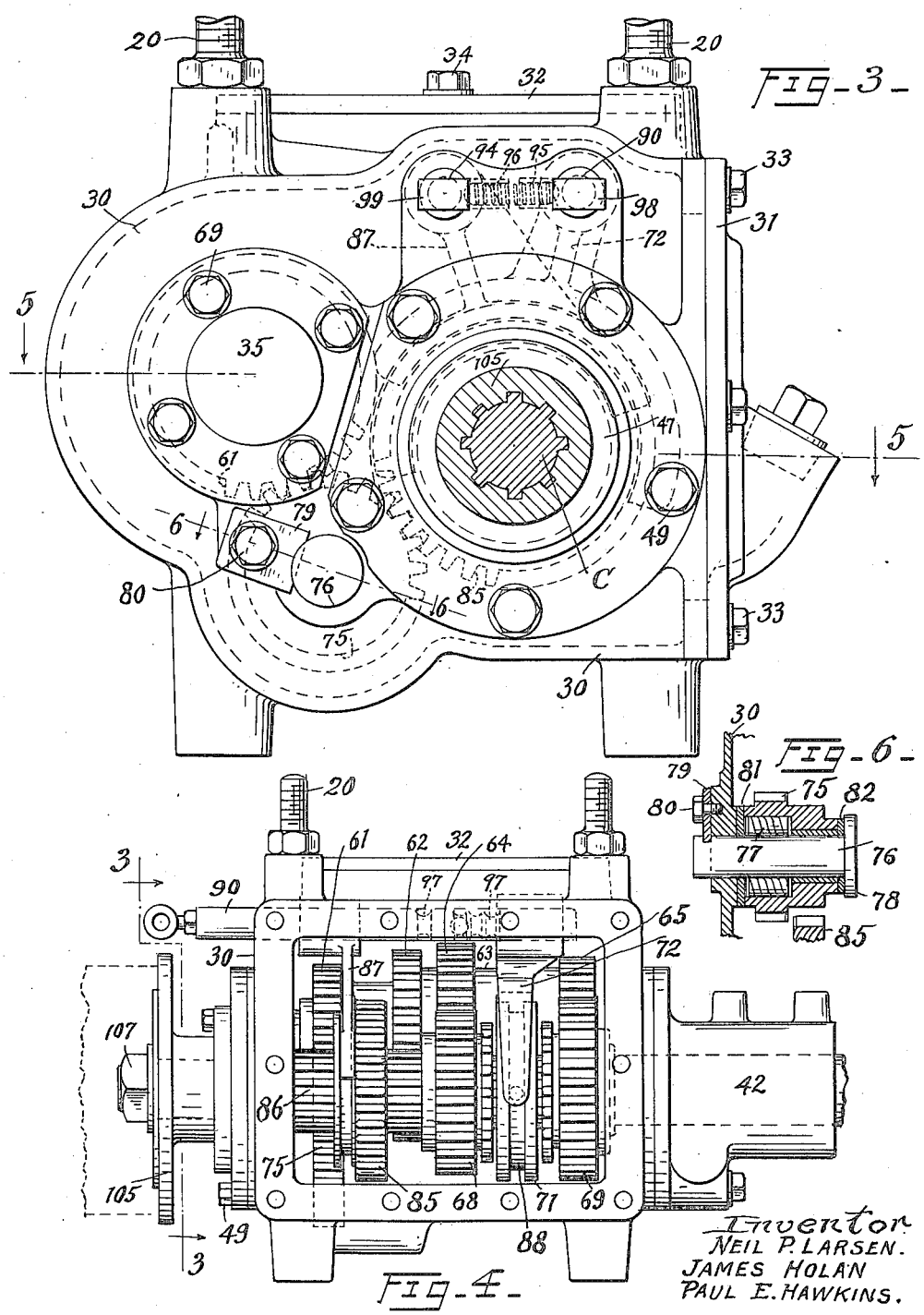

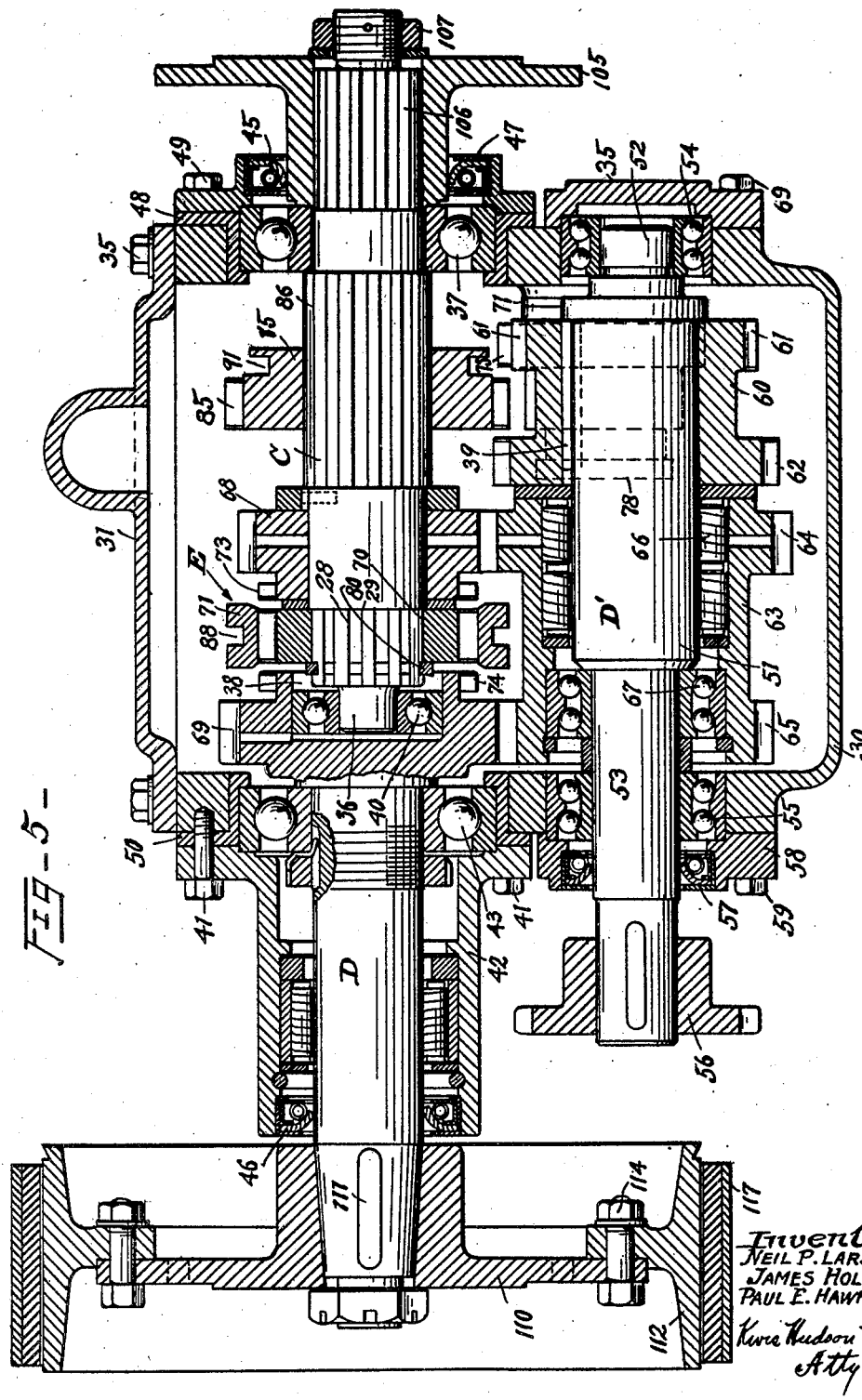

1,999,612

UNITED STATES PATENT OFFICE 1,999,612

MOTOR DRIVEN VEHICLE

Neil P. Larsen, University Heights, and James Holan and Paul E. Hawkins, Lakewood, Ohio, assignors to The American Coach and Body Company, Cleveland, Ohio, a corporation of Ohio Application May 5, 1932, Serial No. 609,440

8 Claims. (Cl. 74—338)

The present invention relates to motor driven vehicles, and more particularly to such a vehicle provided with an auxiliary drive take-off between the transmission and rear axle.

An object of the present invention is the provision of a novel auxiliary drive take-off for motor vehicles, which may be operated at will without interference with the normal operation of said vehicle, and regardless of whether the vehicle is at rest or in motion.

Another object of the invention is the provision of a novel auxiliary drive take-off for motor driven vehicles, which includes an auxiliary transmission supported by the vehicle frame and interposed in the propeller shaft between the main transmission and rear axle thereof, whereby an auxiliary drive is taken off behind the auxiliary transmission which may be employed to obtain different speeds for said drive.

Another object of the invention is the provision of a novel auxiliary transmission adapted to be interposed in the drive of a motor driven vehicle between the main transmission and the rear axle thereof, consisting of a driving shaft adapted to be operatively connected to the main transmission, a driven shaft adapted to be operatively connected to the rear axle, an auxiliary drive shaft, means for rotating said driven shaft at a plurality of speeds from said driving shaft including a gear cone rotatably supported on said auxiliary drive shaft, and means for driving said auxiliary drive shaft from said driving shaft.

Further objects and advantages of the invention will be apparent to those skilled in the art, from the following description of the preferred embodiment described with reference to the accompanying drawings, in which, Figure 1 is a plan view of a portion of a motor driven vehicle chassis, provided with the present invention.

Fig. 2 is a side elevation of the chassis illustrated in Fig. 1.

Fig. 3 is a section on the line 3—3 of Fig. 4, looking in the direction of the arrows.

Fig. 4 is a side elevation of the device illustrated in Fig. 3, looking from the right as viewed in this figure with the side plate removed.

Fig. 5 is a section approximately on the line 5—5 of Fig. 3 looking in the direction of the arrows, and Fig. 6 is a section on the line 6—6 of Fig. 3 looking in the direction of the arrows.

Similar reference characters designate corresponding parts throughout the several figures of the drawings.

Referring to the drawings, the reference character A designates the frame of a motor vehicle of which only the rear part of the chassis is illustrated. The frame A includes a plurality of longitudinal members 9 and 10 and cross members 11, 12, 13 and 14, riveted or otherwise secured together in any well known manner. The transmission and rear axle of the vehicle are designated in general by the reference characters 16 and 17, respectively. These features of a motor driven vehicle may be standard parts of any well known motor vehicle, are well known in the art, and form no part of the present invention. An auxiliary transmission, designated in general by the reference character B, is bolted as by the bolts 20, to the cross members 11 and 12, and is operatively connected to the transmission 16 by a telescopic front propeller shaft 21 through universal joints 22 and 23. The rear axle is driven from the auxiliary transmission B through a telescopic rear propeller shaft 25, operatively connected to the auxiliary transmission and the rear axle by means of universal joints 26 and 27 respectively.

The auxiliary transmission B consists of an enclosed housing 30, provided with a side cover plate 31 and a top cover plate 32 detachably secured thereto by bolts 33 and 34, respectively. A driving shaft C provided with a pilot 36 at its rear end, is rotatably supported at its front end in the housing 30 by means of anti-friction bearings 37, and at its rear end by means of the pilot 36 in an aperture 38, formed in a driven shaft D, by anti-friction bearings 40. The shaft D is in axial alignment with the shaft C and is rotatably supported in the housing 30, and a sleeve member 42 secured thereto by means of bolts 41 and anti-friction bearings 43 and 44 respectively. The shafts C and D project to the front and rear of the housing 30, respectively, and oil retainers 45 and 46 are employed to prevent the leakage of oil from said housing at the openings through which said shafts project. The oil retainer 45 is supported in a member 47, which, together with a spacer member 48, positioned between the outer race of the bearing 37 and the housing 30, is secured to said housing by means of bolts 49, while the oil retainer 46 is secured within the rear end of the sleeve 42. A spacer member 50, similar to member 48, is interposed between the outer race of the bearing 43 and the housing 30.

An auxiliary drive shaft D' comprising an enlarged central portion 51 and reduced end portions 52 and 53, is rotatably supported at opposite ends in the housing 30 by anti-friction bearings 54 and 55. The bearing 54 is enclosed by a cover plate 35 secured to the housing 30 by bolts 69. The rear end 53 of the shaft 50 projects through the housing 30 and is adapted, at its outer end, to have a drive take-off illustrated as a sprocket wheel 56 secured thereto. An oil retainer 57, supported in a member 58 secured to the housing 30 by means of bolts 59, prevents leakage of oil in the opening through which the shaft D' projects. A gear cone 60, consisting of integrally formed gears 61 and 62, is keyed as by the key 39, to the enlarged portion 51 of the shaft D'. A second gear cone 63, consisting of integrally formed gears 64 and 65, is rotatably supported on the shaft D' by means of roller bearings 66 and ball bearings 67. The gear 64 of the gear cone 63 is continuously in mesh with the gear 68 rotatably supported on the shaft C, and the gear 65 is continuously in mesh with a gear 69 formed integral with the shaft D. The shaft C is adapted to be connected to the gear 68, or direct to the shaft D, by means of a clutch designated in general by the reference character E, comprising a member 70 splined to a section 28 of the shaft C and held in position thereon against a shoulder 29 by a spring lock 80. A member 71 splined to the member 70, is adapted to be moved axially thereof, by a yoke member 72, to engage a clutch element 73 formed integral with the gear 68 or a clutch element 74 formed integral with the shaft D.

A reversing gear 75 rotatably supported on a fixed shaft 76 by means of anti-friction bearings 77 is continuously in mesh with the gear 61 of the gear cone 60. The shaft 76 has a head 78 formed integral therewith and is supported in a suitable aperture in the housing 30. A lock member 79, secured to the housing by a bolt 80, projects into a groove in the shaft 76 and retains the same in position. A gear 85, splined to a section 86 of the shaft C, is adapted to be moved axially of said shaft, by the yoke member 87, in either direction from its neutral position illustrated in Fig. 5, to engage the reverse gear 75 or the gear 62 of the gear cone 60, whereby the shaft D may be driven in either direction and preferably at different speeds. The yoke member 72 which engages in a groove 88 in the clutch member 71 is fixed to a longitudinally reciprocable shaft 90, slidably supported in suitable bearings in the housing 30, and the yoke member 87 which engages in a groove 91 in the hub of the gear 85 is fixed to a similar shaft 94 slidably supported in the housing 30. Spring pressed plungers 95 and 96, adapted to engage suitable grooves 97 in the shafts 90 and 94, retain said shafts in predetermined positions with the elements controlled thereby in their neutral or either of their engaged positions.

The shafts 90 and 94 are reciprocated longitudinally to move the clutch member 71 and the gear 85 by mechanism (not shown) located in the cab of the vehicle and connected to eyes 98 and 99 formed in the ends of said shafts.

The universal joint 23 is bolted or otherwise secured to a disk member 105 keyed to a spline section 106 of the shaft C and retained thereon by the nut 107. A disk member 110 keyed as by the key 111 to the rear end of the shaft D, has a brake drum 112 bolted thereto by means of bolts 114. A brake 117 supported about the brake drum 112 by means of a bracket 118 attached to the sleeve 42 by bolts 119, is adapted to be applied thereto by means of a hand lever 120 located in the control cab of the vehicle and connected thereto by a brake rod 121. The reference character 122 designates a flexible speedometer shaft operatively connected to a gear on the shaft D.

From the foregoing description it will be apparent that the driving shaft C is driven from the transmission 16 through the front propeller shaft 21 and may be operatively connected to the auxiliary drive shaft D' through the gear 85 and the gear cone 60, or to the driven shaft D through the gear 68, the gear cone 63 and the gear 69, or directly connected thereto, by means of the clutch E, and that the auxiliary drive shaft D' may be driven in opposite directions through the reverse gear 75 or the gear 62 and preferably at different speeds.

It will be noted that the brake drum 112 is supported by the shaft D of the auxiliary transmission B, which permits the brake 117 to be applied thereto and the motor vehicle held stationary while the auxiliary drive is being operated.

The invention has been described with reference to the preferred embodiment thereof, but it is understood that it is susceptible of numerous constructions and we do not wish to be limited to the particular construction illustrated, and particularly point out and claim as our invention.

We claim:—

1. A transmission for a motor vehicle, comprising a driving shaft rotatably supported by said housing, a driven shaft rotatably supported by said housing, an auxiliary shaft rotatably supported by said housing, selective means associated in part with said auxiliary shaft for driving said driven shaft at a plurality of speeds, means for driving said auxiliary shaft from said driving shaft independently of the driven shaft both when the latter is operatively connected to the driving shaft and when it is disconnected therefrom, and power take-off means connected to said auxiliary shaft.

2. A transmission for a motor vehicle, comprising a housing, a driving shaft rotatably supported by said housing, a driven shaft rotatably supported by said housing, an auxiliary shaft rotatably supported by said housing, means for driving said driven shaft from said driving shaft including a gear cone rotatably supported on said auxiliary shaft, means for driving said auxiliary shaft from said driving shaft independently of the driven shaft both when the latter is operatively connected to the driving shaft and when it is disconnected therefrom, and power take-off means connected to said auxiliary shaft.

3. A transmission for motor driven vehicles comprising a housing, a driving shaft rotatably supported by said housing, a driven shaft rotatably supported by said housing, an auxiliary shaft rotatably supported by said housing, selective means for driving said driven shaft from said driving shaft at a plurality of speeds, means for driving said auxiliary shaft at a plurality of speeds from said driving shaft independently of the driven shaft both when the latter is operatively connected to the driving shaft and when it is disconnected therefrom and during the operation of said driven shaft at any of said speeds, and power take-off means connected to said auxiliary shaft.

4. A transmission for motor driven vehicles, comprising a housing, a driving shaft rotatably supported by said housing, a driven shaft rotatably supported by said housing, an auxiliary shaft rotatably supported by said housing, means for driving said driven shaft from said driving shaft including a gear cone rotatably supported on said auxiliary shaft, means for driving said auxiliary shaft from said driving shaft independently of the driven shaft both when the latter is operatively connected to or disconnected from the driving shaft, means for reversing the direction of drive of said auxiliary shaft, and power take-off means connected to said auxiliary shaft.

5. A transmission for motor driven vehicles, comprising a housing, a driving shaft rotatably supported by said housing, a driven shaft rotatably supported by said housing, an auxiliary shaft rotatably supported by said housing, means for driving said driven shaft from said driving shaft including a gear cone rotatably supported on said auxiliary shaft, means for driving said auxiliary shaft at a plurality of speeds from said driving shaft independently of the driven shaft both when the latter is operatively connected to or disconnected from the driving shaft, and power take-off means connected to said auxiliary shaft.

6. A transmission for motor driven vehicles, comprising a housing, a driving shaft rotatably supported by said housing, a driven shaft rotatably supported by said housing, an auxiliary shaft rotatably supported by said housing, a gear cone rotatably supported on said auxiliary shaft, a gear rotatably supported on said driving shaft continuously in mesh with a gear on said gear cone, a gear fixed to said driven shaft continuously in mesh with a gear on said gear cone, clutch means for operatively connecting said driving shaft to said gear rotatably supported thereon, clutch means for directly connecting said driving shaft to said driven shaft, means for driving said auxiliary shaft from said driving shaft independently of the driven shaft both when the latter is operatively connected to or disconnected from the driving shaft, and power take-off means connected to said auxiliary shaft.

7. A transmission for motor driven vehicles, comprising a housing, a driving shaft rotatably supported by said housing, a driven shaft rotatably supported by said housing, an auxiliary shaft rotatably supported by said housing, means for driving said driven shaft from said driving shaft including a gear cone rotatably supported on said auxiliary shaft, means for driving said auxiliary shaft at a plurality of speeds from said driving shaft independently of the driven shaft both when the latter is operatively connected to or disconnected from the driving shaft, power take-off means connected to said auxiliary shaft, and a brake drum supported by said driven shaft.

8. A transmission for motor driven vehicles, comprising a housing, a driving shaft rotatably supported by said housing, a driven shaft rotatably supported by said housing, an auxiliary shaft rotatably supported by said housing, a gear cone rotatably supported on said auxiliary shaft, a gear rotatably supported on said driving shaft continuously in mesh with a gear on said gear cone, a gear fixed to said driven shaft continuously in mesh with a gear on said gear cone, clutch means for operatively connecting said driving shaft to said gear rotatably supported thereon, clutch means for directly connecting said driving shaft to said driven shaft, a gear cone keyed to said auxiliary shaft, a reverse gear rotatably supported by said housing and continuously in mesh with a gear on said gear cone, a gear splined to said driving shaft adapted to be engaged with said reverse gear or with a gear on the last mentioned gear cone, and power take-off means connected to said auxiliary shaft.

NEIL P. LARSEN.
JAMES HOLAN.
PAUL E. HAWKINS.